United States Patent Office 2,816,859
Patented Dec. 17, 1957

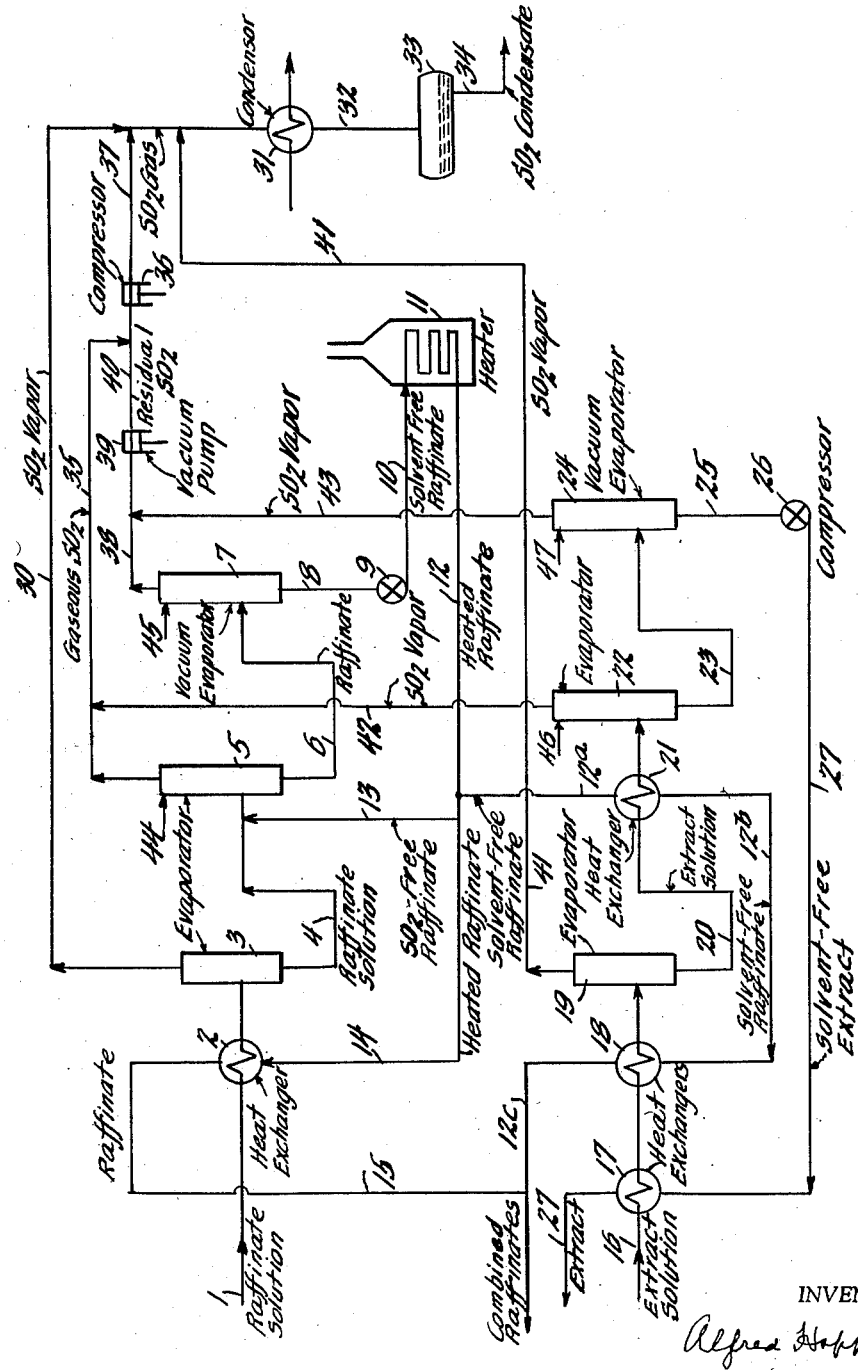

2,816,859

PROCESS FOR THE RECOVERY OF SOLVENTS FROM PRODUCTS CONTAINING THEM

Alfred Hoppe, Frankfurt am Main, Germany, assignor to Edeleanu Gesellschaft m. b. H., Frankfurt am Main, Germany, a body corporate of Germany Application November 5, 1954, Serial No. 467,121

Claims priority, application Germany November 7, 1953

2 Claims. (Cl. 202—72)

At the present time many processes are known in which solvents are used to split up mixtures into components having different properties. For this purpose the differing solubilities of the components in the solvent is utilised. Thus, for example, in the mineral oil industry processes are used in which a natural or artificially produced hydrocarbon oil is split up by means of a selective solvent into more valuable and less valuable components, or in which solid and liquid components are separated from one another by means of a solvent. From a solvent-containing product so obtained the solvent is recovered and used again. Due to thermal and apparatus considerations, the recovery of the solvent by distillation is in most cases carried out in a plurality of evaporation stages working at progressively increasing temperatures and decreasing pressures.

In many cases the distillation temperature required in a higher temperature stage is such as to cause reaction between the dissolved product and the solvent. Decomposition products derived from the solvent may impair the product to be obtained or may have a corrosive action on the apparatus.

An object of the present invention is to provide a process for recovering solvents from products containing them, in which undesired reactions do not occur.

In the process of this invention a part of the product which has been substantially freed from solvent is heated to a high temperature and brought into contact with the product still containing solvent. The temperature and the quantity of the solvent-free product, which is thus used as a heat transfer medium, are chosen according to the heat required. The heat supplied by direct heat exchange instantaneously converts into vapour the solvent still present in the solvent-containing product. The solvent-free product can be heated to a high temperature without the risk of the occurrence of undesired reactions. Reaction between the solvent and the product to be recovered cannot occur at all or only to a small extent, since the period of contact between the solvent-free product and the solvent-containing product is very short. Similarly, decomposition of the solvent, for example, in the case of the chlorinated hydrocarbons often used as solvents, and the consequent impairment of the finished product and injury to the apparatus, are avoided or considerably reduced.

A further part of the highly heated solvent-free product may also be used by indirect heat exchange for preheating the product still containing solvent.

The process of this invention is especially advantageous where heating media are cheaply available as, for example, in oil refineries, whereas it is necessary to install a separate source of energy if the solvents is to be expelled with the use of steam.

The invention is illustrated by way of example in connection with the accompanying drawing, which shows diagrammatically a plant for recovering the sulphur dioxide used as a selective solvent for the treatment of a mineral oil distillate to split it up into a raffinate solution and an extract solution from which the solvent is to be recovered.

The raffinate solution, which consists of 5 parts by weight of oil and 2 parts by weight of sulphur dioxide, is supplied by a conduit 1 through a heat exchanger 2 to an evaporator 3, into which the solution enters at a temperature of about 180° C. About 1.9 parts by weight of sulphur dioxide are evaporated in the evaporator 3 under a pressure of 6 atmospheres (the pressures given herein are measured in atmospheres absolute). The sulphur dioxide vapour passes through a conduit 30 to a water cooled condenser 31. The liquefied sulphur dioxide then flows through a conduit 32 into a receiver 33, from which it can be discharged through a conduit 34.

In the lower part of the evaporator 3 a raffinate solution is collected having a temperature of 180° C., and consisting of 5 parts by weight of raffinate oil and 0.1 part of sulphur dioxide. The raffinate solution passes from the evaporator 3 through a conduit 4 into an evaporator 5 in which the pressure is one atmosphere. By introducing 1.4 parts by weight of sulphur dioxide-free raffinate heated to 280° C. through a conduit 13 into the mixture entering the evaporator 5, the mixture is heated to about 200° C. In the evaporator 5 the sulphur dioxide is expelled from the raffinate in gaseous form by the heat supplied by the hot solvent-free product, and the sulphur dioxide gas is sucked through a conduit 35 by means of a compressor 36 and forced through a conduit 37, and condensed in the condenser 31 together with the sulphur dioxide vapour from the conduit 30. In order to remove traces of sulphur dioxide from the raffinate leaving the evaporator 5, the raffinate is passed through a conduit 6 without being further heated into a vacuum evaporator 7. A vacuum pump 39 sucks the traces of residual sulphur dioxide under a pressure of 0.05 atmosphere through a conduit 38, and forces it through a conduit 40 into the suction side of the compressor 36. The solvent-free raffinate is withdrawn from the evaporator 7 through a conduit 8 by suction produced by a pump 9, and is passed through a conduit 10 to coiled tube heater 11, in which the raffinate is heated to about 280° C.

A part of the heated raffinate is mixed by passing it through the conduits 12 and 13 with the solvent-containing raffinate from the evaporator 3, whereby the solvent-containing raffinate is heated from about 180° C. to about 200° C. as described above. A further portion of the heated raffinate is passed through a conduit 14 into the heat exchanger 2. After it has heated the raffinate solution in the heat exchanger 2 the raffinate leaving the heat exchanger passes through a conduit 15, whereby it is mixed with solvent-free raffinate, which has been used as described below for heating the extract solution, and the combined raffinates are fed to a storage tank (not shown).

The extract solution which is obtained in the extraction process and consists of sulphur dioxide and the non-paraffinic oil constituents dissolved therein, is likewise split up into oil and solvent in a plant similar to that described above. The extract solution supplied through a conduit 16 is heated by a solvent-free extract in a heat exchanger 17 and by heated solvent-free raffinate in a heat exchanger 18 to about 180° C., and is then passed into the evaporator 19. This evaporator, like the first evaporator 3 of the raffinate recovery plant, is under a pressure of about 6 atmospheres. The sulphur dioxide vapour from the evaporator 19 passes through a conduit 41 and passes together with the sulphur dioxide vapour in the conduit 30 into the condenser 31. The condensate is collected, as described above, in the receiver 33.

The extract solution which has been freed from a large part of its sulphur dioxide is conveyed from the evaporator 19 by suction through a conduit 20 and heat exchanger 21 into the evaporator 22. In the heat exchanger 21 the extract solution is heated to 200° C. by indirect heat exchange with solvent-free raffinate with hot solvent free raffinate derived from the conduit 12 by means of the conduit 12a. The raffinate leaves the heat exchanger through a conduit 12b and enters the heat exchanger 18, in which it gives up sensible heat, to the extract solution which has been preheated in the heat exchanger 17. The raffinate leaves the heat exchanger 18 through the conduit 12c in which it is united with the raffinate from the conduit 15 and leaves the plant.

The compressor 36 sucks by way of conduits 42 and 35 sulphur dioxide vapour leaving the evaporator 22. After the vapour has been compressed, it passes by way of the conduit 30 to the condenser 31 and receiver 33.

The extract from the evaporator 22 is sucked by way of conduit 23 into a vacuum evaporator 24, in which the last traces of sulphur dioxide are removed under a pressure of 0.05 atmosphere. The vacuum pump 39 sucks the sulphur dioxide vapour from the evaporator 24 by way of a conduit 43. The solvent-free extract is supplied by means of a conduit 25, pump 26 and conduit 27 to the heat exchanger 17, in which it serves to preheat the extract solution containing sulphur dioxide as described above. From the heat exchanger 17 the extract passes through a conduit 27 into an extract storage tank (not shown).

Solvent-containing raffinates and extracts obtained from a very wide variety of hydrocarbon oil fractions can be treated in accordance with the process of this invention. When the solvent is evaporated from lower boiling fractions a part of the material which is to be freed from solvent passes over in the form of vapour together with the solvent. In such cases, it is therefore of advantage to return such evaporated portions to the evaporator as a refluxing agent. Thus, in the example described above the cooled raffinate evaporated from the raffinate evaporators 5 and 7 may be returned as a refluxing agent to these evaporators at 44 and 45, respectively, and similarly the cooled extract evaporated from the extract evaporators 22 and 24 may be returned to these evaporators at 46 and 47, respectively.

It will be understood that the invention is applicable to processes, other than that described in the above example, in which solvents are to be removed from products containing them.

I claim:

1. In a process for the recovery of solvent from a product containing a solvent which is more volatile than the product and causes injury to the product when heated in contact therewith above a certain temperature, in which process the solvent is evaporated until the product is substantially free from solvent in a plurality of evaporation stages operated at progressively decreasing pressures and at increasing temperatures from at least one of the evaporation stages to the next following stage, the improvement which comprises heating the solvent-containing product obtained from a lower temperature stage to expel solvent therefrom in a higher temperature stage by mixing with the said solvent-containing product a part of the solvent-free product of which the quantity and the temperature, which is produced by heating the solvent-free product subsequently to its production and is above that at which the solvent causes injury to the product, are such as to supply the heat required rapidly to expel the said solvent.

2. In a process for the recovery of solvent from a hydrocarbon oil raffinate containing a solvent which is more volatile than the raffinate and causes injury to the raffinate when heated in contact therewith above a certain temperature, in which process the solvent is evaporated until the raffinate is substantially free from solvent in a plurality of evaporation stages operated at progressively decreasing pressures and at increasing temperatures from at least one of the evaporation stages to the next following stage, the improvement which comprises heating the solvent-containing raffinate obtained from a lower temperature stage to expel solvent therefrom in a higher temperature stage by mixing with the said solvent-containing raffinate a part of the solvent-free raffinate of which the quantity and the temperature, which is produced by heating the solvent-free raffinate subsequently to its production and is above that at which the solvent causes injury to the product, are such as to supply the heat required rapidly to expel the said solvent.

References Cited in the file of this patent

UNITED STATES PATENTS

| | | |
|---|---|---|
| 1,910,341 | Jodeck | May 23, 1933 |
| 1,982,513 | Grote et al. | Nov. 27, 1934 |
| 2,146,679 | Konemann et al. | Feb. 7, 1939 |
| 2,521,766 | White et al. | Sept. 12, 1950 |
| 2,645,608 | Linn et al. | July 14, 1953 |
| 2,712,519 | Hoppe | July 5, 1955 |